Figure 3:
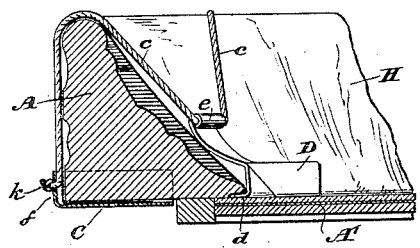

(No Model.) 2 Sheets—Sheet 1.
H. LEVY.
DEVICE FOR ATTACHING COVERS TO PICTURE FRAMES.
No. 467,700. Patented Jan. 26, 1892.
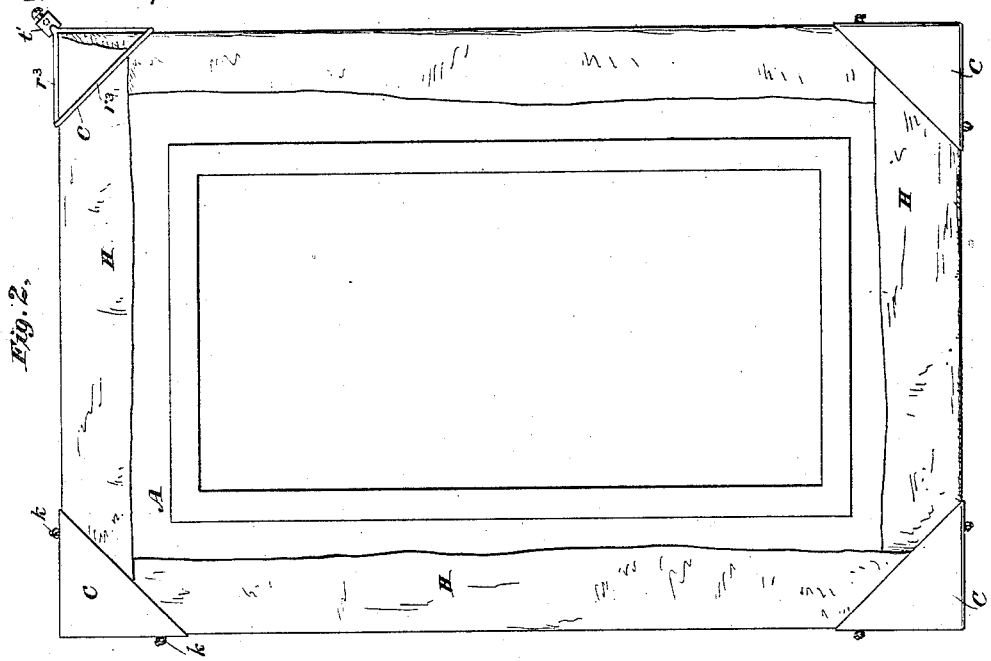
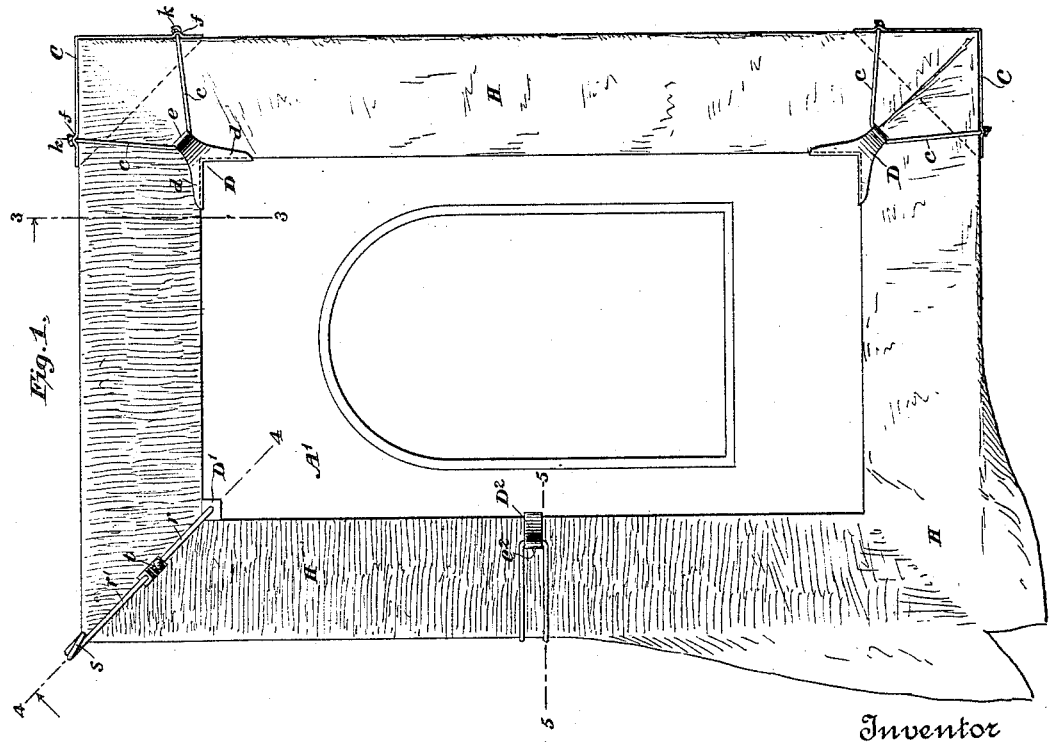
Witnesses
Geo. W. Breck
Edward Thorpe
Inventor
Henry Levy
By his Attorney
Willard Parker Butler (No Model.) 2 Sheets—Sheet 2.

H. LEVY.
DEVICE FOR ATTACHING COVERS TO PICTURE FRAMES.

No. 467,700. Patented Jan. 26, 1892.

Witnesses
Geo. W. Breck.
Edward Thorpe.

Inventor
Henry Levy
By his Attorney
Willard Parker Butler

UNITED STATES PATENT OFFICE.

HENRY LEVY, OF NEW YORK, N. Y., ASSIGNOR OF ONE-HALF TO ADOLPH HIRSH, OF SAME PLACE.

DEVICE FOR ATTACHING COVERS TO PICTURE-FRAMES.

SPECIFICATION forming part of Letters Patent No. 467,700, dated January 26, 1892.

Application filed May 10, 1890. Serial No. 351,285. (No model.)

*To all whom it may concern:*

Be it known that I, HENRY LEVY, a subject of the Emperor of Austria-Hungary, and a resident of the city, county, and State of New York, have invented a new and useful Improvement in Devices for Attaching Covers to Picture-Frames, Looking-Glasses, &c., of which the following is a specification.

My invention relates to an improvement in devices for attaching covers of all descriptions to the frames of pictures, looking-glasses, advertising-signs, bar-room fixtures, and other similar articles; and the object of the same is to provide a cheap, simple, and durable device for the purpose of covering the frames of such articles with cloth or other desirable material for the purpose of protecting them from exposure to the light, insects, dust, and other foreign substances, as well as under certain conditions to protect them from moisture and injury by contact with other objects.

As is well known, in many localities picture-frames, looking-glass frames, and other similar frames and objects are constantly liable to become injured by the sunlight, by moisture, and by the presence of insects, and various devices have been resorted to for the purpose of covering and protecting picture and other frames in the manner indicated and for these purposes. Heretofore it has only been possible to apply the material used for covering the same by the laborious and tedious process of attaching the same by hand, by small tacks, pins, and other similar contrivances, which are more or less inefficient and troublesome, and which to a greater or less extent disfigure the frame or object to which they are attached, and which can only be removed with considerable trouble and inconvenience when it is desired to expose the frame in its ordinary condition.

The object of my invention is to provide a device which shall accomplish the same results, and which shall be at the same time durable, economical, and simple, and which may be used from time to time as circumstances may necessitate without injuring the article or the device, and which at the same time may be used upon a variety of structures without reference to their particular shape.

The invention will be best understood by reference to the accompanying two sheets of drawings, in which—

Figure 4:
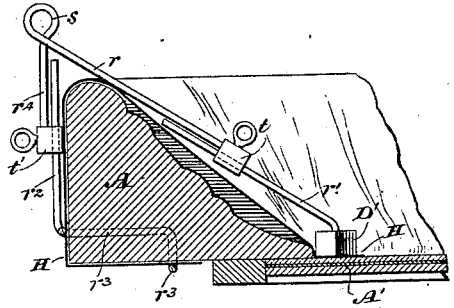
Figure 5:
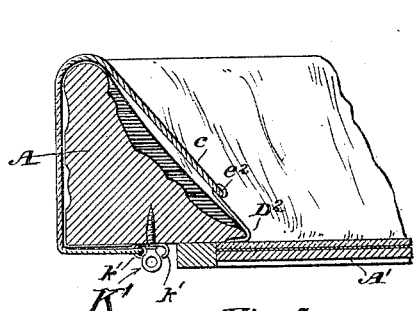

Figure 1 is a front view of the frame, showing the device attached; Fig. 2, a rear view; Fig. 3, a cross-section on the line 3 3 of Fig. 1; Fig. 4, a cross-section on the line 4 4 of Fig. 1; Fig. 5, a cross-section on the line 5 5 of Fig. 1, and Figs. 6 and 7 views of a modification.

Similar letters refer to similar parts throughout the several views.

In the drawings, A represents the picture-frame or looking-glass frame, or any similar object in the nature of a frame in which a beveled edge is used coming into contact with the glass, picture, or other flat surface A', so that there is a slight space between the edge of the frame and the surface within it, as is ordinarily found in all looking-glasses and pictures.

C represents a clamp composed of any suitable material—such as tin, brass, &c.—formed in the manner indicated, with two sides at right angles to each other, turned up so as to form an upright flange or edge and to fit closely over the corner of the rectangular frame or other object to be covered, which will hold the clamp in position, as hereinatfer shown, or instead of an upright flange an ordinary thumb-screw can be used, which screws into the stretcher or frame.

For the purpose of connecting the clamp C to the frame and for the purpose of holding the material used as covering in position, I make use of an interior clamp D, which is also so arranged that two beveled edges at right angles to each other will fit over the inner surface of the frame, and these edges are provided with two horizontal flanges $d$, which are arranged to be inserted between the edge of the frame and the flat surface within it, and so serve to hold the clamp D securely in position. The clamp D terminates in an eyelet $e$, through which passes a cord $c$, composed of india-rubber or other flexible material, and this cord is passed over the edge of the frame, as shown in the views, and is connected at the outer edge with the rear clamp in any convenient manner, preferably by being passed through eye-holes in the clamp, and simply knotted at either end in such a way that when the two clamps are put over the edge of the frame in the manner shown in the views the two clamps will be held firmly against the frame, and the material of which the clamp is made is held beneath the cords at two convenient points, and in this manner securely and firmly kept in position.

H represents the covering, which may be of any desired material, according to circumstances, and which will be held down by the cord. When it is desired to remove the covering, all that is necessary is to thrust the inner clamp outward with the finger, whereby the elastic cord will cause the lower clamp D to be released, whereby the clamp is removed.

Fig. 4 shows a modification used in cases where it is desired to substitute a permanent material for the elastic cord. This device is also shown at the left-hand corner of Fig. 1 and the right-hand corner of Fig. 2. In this form a bent wire or rod $r^3$ is used instead of the clamp C, so bent as to fit over the corner of the frame. The vertical part $r^2$ of this rod has a sliding thumb-screw connection $t'$, which connects with a vertical rod $r^4$, bent into a spring at $s$, and then passing downward over the edge of the frame. This part of the rod is likewise made in two sections $r$ and $r'$, connected by a similar thumb-screw $t$ or other convenient screw device, as shown in the views, and by unscrewing the thumb-screws and moving the two portions of the rods with reference to each other the clamps $r^3$ and D' may be brought into closer proximity, as desired, so as to make it possible to adjust and fit the holder to any picture-frame without reference to its particular dimensions. If desired, the clamp C in form shown in Fig. 1 may be employed and the extremity of the rod $r^2$ attached to it, so that it shall fit over the rear of the frame as before. If desired, any form of ornament may be attached to the rod or to the clamps, or the latter may be ornamented with any pattern by stamping it upon them or otherwise.

The clamp D in this form of device is preferably replaced by an ordinary piece of flat metal or rubber D', as shown, as the rod acts as a spring to hold the clamp D' in place. If desired, a similar clamp may be used at any point upon the side of the frame.

In case it is desired to offer additional holding-surface for the covering on the side of a long frame, such as a looking-glass, the device shown in Fig. 5 is used, which consists of a supplementary clamp $D^2$, provided with an eyelet $e^2$, placed between the frame and the flat surface held therein, as before, having an elastic cord $c$ connected, as before, therewith and passing over the frame and connecting with an eyelet or thumb-screw K, with three hooks upon its edge screwing into the rear of the frame or upon the stretcher of the flat object within, which may be secured in position before the frame is put up, and may be retained upon the rear of the frame continuously without reference to the fact of whether it is covered or not, as this eyelet will be hidden when the frame is hung upon the wall.

The object of providing three hooks on the thumb-screw K is to make extra elastic zig-zag connections between any two or more fasteners on the side of a long frame for the purpose of increasing its holding capacity.

Figure 6:
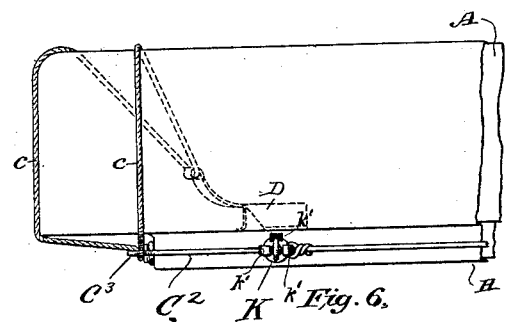
Figure 7:
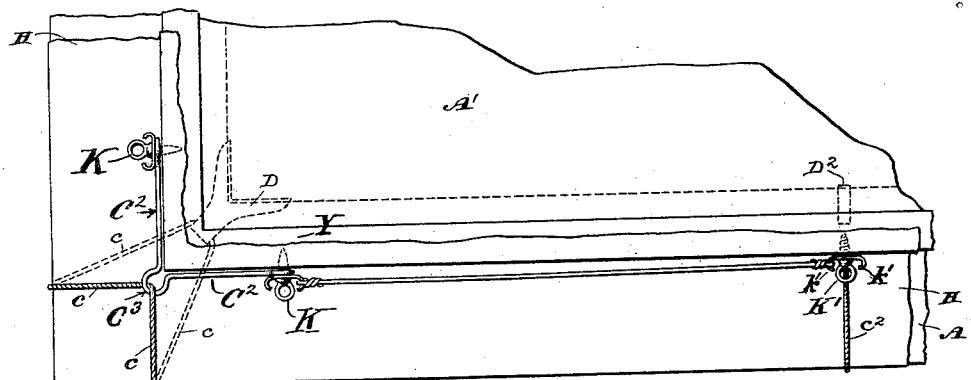

An additional modification is shown in Figs. 6 and 7. This consists of an angular screw-clamp $C^2$, composed of bent sheet metal, rod, or wire of the character shown, provided with thumb-screws K' K' at either end similar to those above described, which clamp fits over the corner of the outer surface of the stretcher or other similar surface on which the picture or looking-glass is mounted, as indicated in the views. An eyelet or hook $C^3$ is provided at the angle of the clamp formed thereon in any convenient manner for permitting additional cords or wires being carried from thence over the corner to an interior clamp similar to the clamp D of Fig. 1; or, if desired, the thumb-screws K' can be used in the same manner, as shown in Fig. 5.

Fig. 7 shows the combination with a corner-clamp, as above described, with a supplemental clamp, such as is shown and described by Fig. 5. Here $D^2$ is the inner clamp; K', the thumb-screw with the three hooks $k'$ $k'$. (The third hook is not seen, being hidden behind the thumb-piece.) $c^2$ is a connecting-cord passing over the frame and attaching to the clamp $D^2$, (shown by the dotted line D.)

It will be obvious from the foregoing description that this invention may be applied to all descriptions of frames, that an infinite variety of covering may be used, that it may be adapted to any class of covering with equal efficiency, that the covering may be removed from time to time and replaced with the greatest convenience, and that the cost of construction of the device is extremely small and its durability extremely great.

Any construction of clamps may be used that will permit of this method of fastening, and they may be given any form of ornamentation desired. Hence I do not limit myself to the particular constructions shown or to the particular agencies resorted to; but claim, broadly, the application to the corners of frames or looking-glasses of removable devices for holding covers in place, without reference to their particular construction, and also in combination with supplemental holding devices upon the sides of the frame.

I claim as my invention—

1. In a device for holding covers for picture-frames, looking-glass frames, &c., the combination, with the frame, substantially as hereinbefore set forth, of an angular clamp fitting over the corner of the frame at the back, a clamp fitting into the corresponding corner in the interior of the frame, and an elastic cord connecting the two clamps, as described.

2. In a device for holding covers for picture-frames, looking-glass frames, &c., the combination, with the frame, substantially as hereinbefore set forth, of a clamp having a beveled holding-edge fitting between the frame and the flat surface within, an angular clamp fitting over the corresponding rear corner of the frame, and an adjustable connection between the two clamps, substantially as described.

3. In a device for holding covers for picture-frames, looking-glass frames, &c., the combination, with the frame, substantially as hereinbefore set forth, with the corner-clamps and the holding connection, of the supplemental clamps upon the sides of the frame, with the supplemental connections between the two for holding the cover.

4. In a device for holding covers for picture-frames, looking-glass frames, &c., the combination, with the frame, of an angular clamp provided with a hook or eyelet at the angle fitting over the corner of the frame at the back, thumb-screws provided with one or more hooks or eyelets at either end of the clamp for attaching the same to the frame, a clamp fitting into the corresponding corner in the interior of the frame, provided, also, with a hook at the angle, and an elastic connection between the clamps engaging with the hooks thereon, whereby the clamps and cover are held in position, substantially as described.

5. In a device for holding covers for picture-frames, looking-glass frames, &c., the combination, with the frame, substantially as hereinbefore set forth, of an angular clamp having a beveled holding-edge fitting between the frame and the flat surface within it at the corner, an angular clamp fitting over the corresponding rear corner of the frame, and an adjustable sliding connection composed of two rods, one of which is connected at one end with one of said clamps and which engage with each other at the other end and having a screw connecting the said engaging ends, whereby the said rods may be so adjusted and held that the clamps will fit any size or shape of frame.

In testimony that I claim the foregoing as my invention I have signed my name, in presence of two witnesses, this 8th day of May, 1890.

HENRY LEVY.

Witnesses:
WILLARD P. BUTLER,
HENRY H. GRAFT.